United States Patent [19]

Kolb

[11] Patent Number: 4,564,927
[45] Date of Patent: Jan. 14, 1986

[54] METHOD AND APPARATUS FOR TESTING SEISMIC VIBRATORS

[75] Inventor: Richard L. Kolb, Altadena, Calif.

[73] Assignee: Crocker National Bank, Los Angeles, Calif.

[21] Appl. No.: 356,875

[22] Filed: Mar. 10, 1982

[51] Int. Cl.$^4$ .......................... G01V 1/24; G01V 1/36
[52] U.S. Cl. ...................................... 367/42; 367/190; 367/47; 364/421
[58] Field of Search .................... 364/421; 367/38, 39, 367/41, 42, 47, 48, 49, 73, 190, 189; 181/401, 113, 114

[56] References Cited

U.S. PATENT DOCUMENTS

| | | | |
|---|---|---|---|
| 3,208,545 | 9/1965 | Doty et al. | 367/190 |
| 3,863,202 | 1/1975 | Landrum, Jr. | 367/190 |
| 3,886,493 | 5/1975 | Farr | 367/47 |
| 3,984,805 | 10/1976 | Silverman | 367/190 |
| 4,042,905 | 8/1977 | Fort et al. | 364/421 |
| 4,058,791 | 11/1977 | Martin et al. | 367/42 |
| 4,064,481 | 11/1977 | Silverman | 364/421 |
| 4,246,652 | 1/1981 | Khan et al. | 367/47 |

FOREIGN PATENT DOCUMENTS 2043896 10/1980 United Kingdom ................ 367/190

OTHER PUBLICATIONS

"Correlation Techniques—A Review," N. A. Anstey, Journal of Canadian Society of Exploration Geophysicists, vol. 2, #1, Dec. 1966, pp. 1-28.
Seriff et al., "Effect of Harmonic Distortion in the Use of Vibratory Surface Sources," 4/70, pp. 234-246.
Interoffice Memo of Mandrel Industries, Inc., 3/23/73, "Vibrator Similarity".
Instructional Manual from Pelton Co., Inc., 12/80, pp. 12-16.

Primary Examiner—Nelson Moskowitz
Assistant Examiner—Ian J. Lobo
Attorney, Agent, or Firm—Kanz, Scherback & Timmons

[57] ABSTRACT

A method of seismic exploration, wherein one or more vibratory sources are employed to generate an input signal whose frequency varies as a function of time and wherein the signal is reflected and refracted to detector stations from subsurface beds, in which the sources are tested for signal accuracy with respect to a reference. The method includes generating at a first location a system reference signal having a pattern of predetermined phase and frequency characteristics and generating at a first source a vibrator control signal or a motion detector signal. The vibrator control signal or the motion detector signal is converted to constant amplitude so that the signal pattern is represented principally by phase and frequency. The system reference signal is correlated with the vibrator control signal or the motion detector signal to generate a cross-correlation function. At the first location a model function is generated and a selected characteristic of the model function is compared with similar characteristics of the cross-correlation function to obtain an indication of the accuracy of the vibrator signal. The source being checked will be utilized in exploration only if the accuracy exceeds a certain level.

12 Claims, 5 Drawing Figures

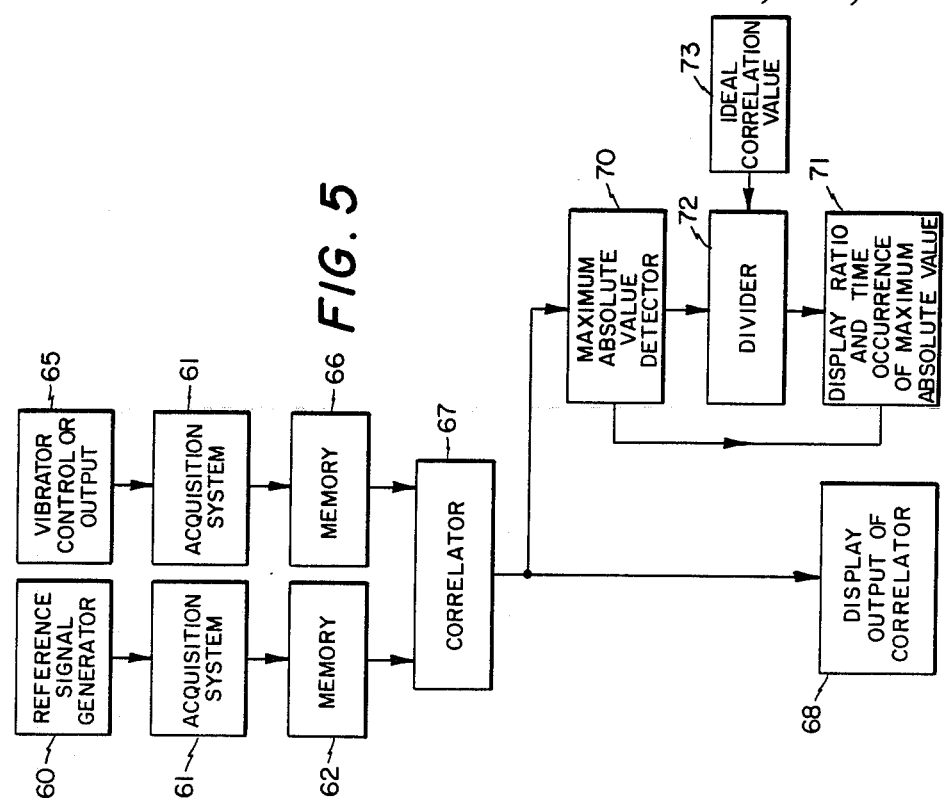
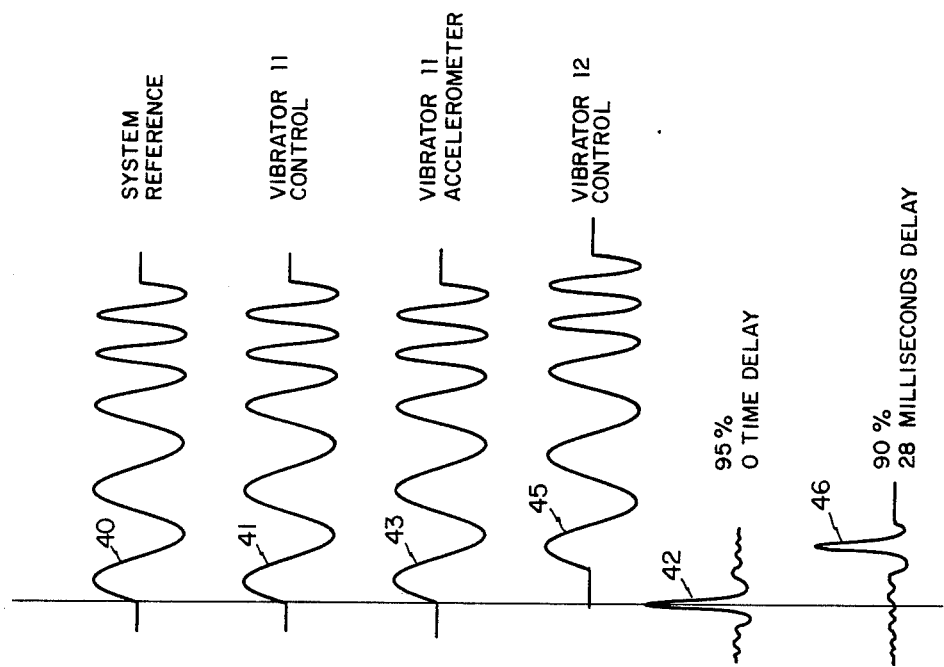

METHOD AND APPARATUS FOR TESTING SEISMIC VIBRATORS

BACKGROUND OF INVENTION

1. Field of Invention

The present invention relates to seismic exploration and more particularly to the conduct of seismic exploration utilizing vibrator sources for the purpose of introducing seismic energy into the earth in conducting the seismic exploration process.

2. The Prior Art

In the seismic exploration art it has become common to use as a seismic wave source an electrohydraulically controlled vibratory source more simply referred to as a vibrator. Typically a vibrator is vehicle mounted. Upon arrival at a selected location a base plate is lowered into contact with the earth's surface and a portion of the vehicle's weight is applied to the base plate to prevent decoupling of the base plate from the ground during operation. The vibrator applies a force proportional to a swept frequency sine wave or some other function to the earth in a manner well known to the art. With this form of signal, the frequency and phase is controlled to produce a signal with specific repeatable characteristics.

The signal generated by the vibrator must be accurate and repeatable to allow cross-correlation with the system reference signal. If the signal generated by the vibrator does not accurately follow the system reference, the peak-to-sidelobe ratio of the cross-correlation will be low and the sidelobes will extend out from the main lobe causing the data to appear "ringy". If the signal generated by the vibrator varies significantly upon repetition, the seismic data will show variations that may lead to false interpretation. Variations in the sweeps generated by the vibrators can cancel high-frequency information or create sidelobes which vary or create false structures in a seismic section. When multiple vibrators are used simultaneously in a seismic survey to increase the signal to noise ratio, they must all independently generate these signals which are accurate and repeatable. As many as four or more vibrators have been utilized to input seismic energy into earth. Inasmuch as these vibrators are activated simultaneously, it is important that the output energies have very similar phase-frequency characteristics over the length of the sweep wave. it is obvious that if one or more of the vibrators is out of phase with the others, there will take place a cancellation of the energy and defeat the purpose of using multiple vibrators.

Accordingly, efforts have been made in one way or other to test the accuracy and consistency of the vibrator signals and to determine the similarities between the outputs of the various vibrators. This has been accomplished by recording the electronic control signal from one vibrator and the accelerometer outputs from all vibrators by way of an oscillographic camera before the start of exploration each day. The oscillographic camera records the analog electric voltage from the vibrator control signal and the accelerometer output signals. An operator or observer is then required visually to compare the analog traces to determine whether the vibrators are "in phase" with the control signal. If a peak of one trace lines up with the trough of another trace, the vibrators are obviously out of phase. The accelerometer outputs from each vibrator must bear some consistent phase relation to the vibrator control signal. The relation must remain constant or the cross-correlation process will vary. The problem comes about when there is but partial misalignment and the judgment becomes subjective. This relationship is difficult to determine and is poorly tested by this subjective judgment. A small amount of misalignment in phase is acceptable but determining the absolute amount of misalignment is difficult inasmuch as the display of the analog signals may be as much as ten feet long and therefore it becomes extremely difficult to determine whether the similarities are acceptable throughout their total length.

SUMMARY OF THE INVENTION

In accordance with the present invention there is provided a method for determining the accuracy and consistency of the vibrator signals and the similarities between the multiplicity of vibrators while avoiding the subjective nature of prior techniques. More particularly, the method of determining the accuracy of the vibrator signal comprises the steps of generating at a first location a system reference signal having a pattern of predetermined phase and frequency characteristics. At the vibrator location itself there is generated a vibrator control signal which is the electronic control for the vibrator and the accelerometer output signal which indicates the seismic energy output of the vibrator. The system reference signal is cross-correlated with both vibrator signals to generate cross-correlation functions. The peak values of the cross-correlation functions are compared with the peak value of an ideal cross-correlation function to indicate the actual degree of accuracy of each of the functions. The peak value of the ideal cross-correlation function represents the largest possible value which can be obtained and therefore the value to which all others are compared. The vibrator producing the signal that meets the criterion of accuracy and consistency is then selected to be utilized in the exploration process.

In a preferred embodiment of the invention the peak value of the ideal cross-correlation function is represented by the total number of samples within the system reference. The ratio of the peak value of the vibrator cross-correlation functions to the peak value of the ideal cross-correlation represents the degree of accuracy of the vibrator signal. The ratio can vary up to 100% representing a vibrator signal which matches the system reference signal perfectly.

In addition to the foregoing, the time of maximum correlation is also determined representing the actual lead time or delay time in the generation of the vibrator signal in response to a start signal from the remote control location.

BRIEF DESCRIPTION OF THE DRAWINGS

In the accompanying drawings:

FIG. 3 illustrates typical wave forms from the system of FIG. 1 and examples of cross-correlation functions;

FIG. 5 illustrates a preferred embodiment of the present invention utilizing a maximum absolute value detector for the correlator output.

DETAILED DESCRIPTION

Figure 1:
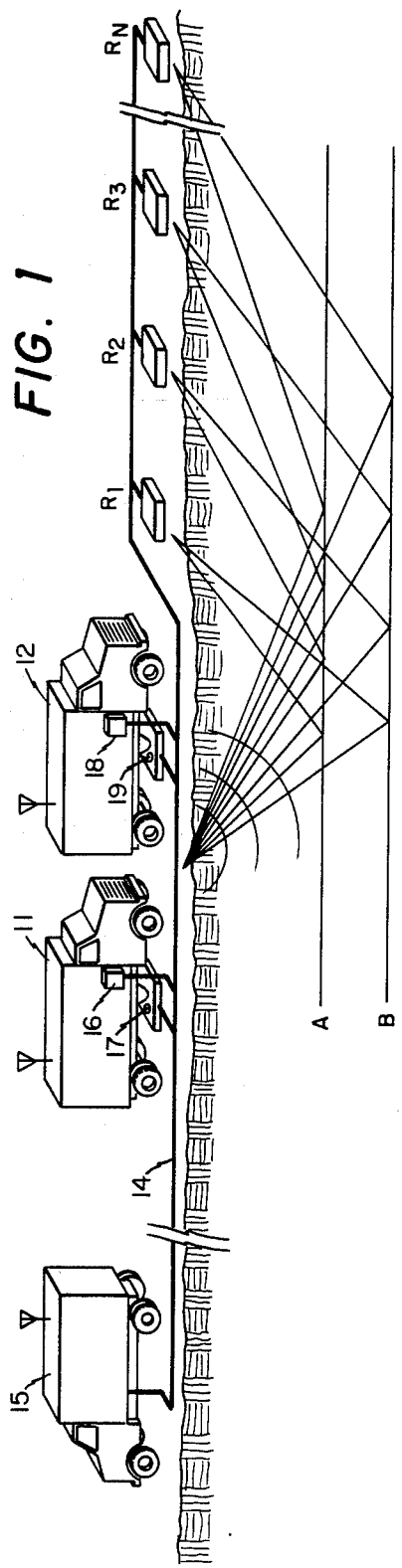
FIG. 1 illustrates a field recording system employing a multiplicity of vibrators.

Referring to FIG. 1 there is illustrated a seismic data gathering system comprised of a plurality of vibrators 11, 12, and a multiplicity of seismic detectors or geophones $R_1, R_2, R_3,—R_n$. The number of geophones or geophone stations may vary in accordance with the resolution desired or the nature of the exploration survey, i.e. whether it be 2D or 3D. The number of geophone stations has ranged from 24 or fewer to as many of 1024. The operation sequence generally is initiated from a recording or control truck 15 either by way of a radio link or by way of cable 14 to start the vibrators 11 and 12 in operation. The vibrators, over a sweep period, generate seismic waves which travel downwardly in a manner depicted by the various ray paths first to be reflected off interface A and then off interface B to return to the earth's surface and be detected by the geophones or geophone stations $R_1, R_2, R_2,—R_n$. The received signals are sent back to the recording truck 15 by way of cable 14 with each geophone station being represented by a separate seismic trace.

It is important that the vibrators 11 and 12 begin their operations at the same moment and generate sweep signals that represent the system reference as accurately as possible and as nearly similar to each other as possible with respect to phase and frequency. If the vibrators do not accurately generate seismic signals which represent the system reference function, the signal to noise ratio of the seismic data will be low. If the vibrators vary with respect to each other, their energy output will be reduced. Taking an extreme example, if vibrator 11 is out of phase with vibrator 12 by 180° a phase coherency of zero the energy output from the vibrators will effectively be cancelled. Therefore in order to get a maximum utilization from one or more vibrators, the output signals should be as nearly like the system reference as possible and as nearly similar to each other as possible in terms of phase and frequency content so that the outputs may be effectively added together to improve the ultimate signal to noise ratio of the received signals and also obtain as great a penetration of the sub-surface as possible.

Each of the vibrators includes an electronic signal generator which determines the characteristics of the sweep signal to be generated by the vibrator. For example, the vibrator 11 includes the electronic sweep generator 16 and the vibrator 12 includes the generator 18. In addition, each of the vibrators is equipped with an accelerometer or similar motion detector which measures the actual seismic energy output of each vibrator. These accelerometers 17 and 19 respectively associated with vibrators 11 and 12 are attached to the mechanical vibrating assembly and output a signal representative of the seismic energy being applied to the earth's surface. Electric signals or electronic signals from the sweep generators 16, 18 and from the accelerometer 17, 19 are transferred back to the recording truck by way of a cable 14.

Figure 2:
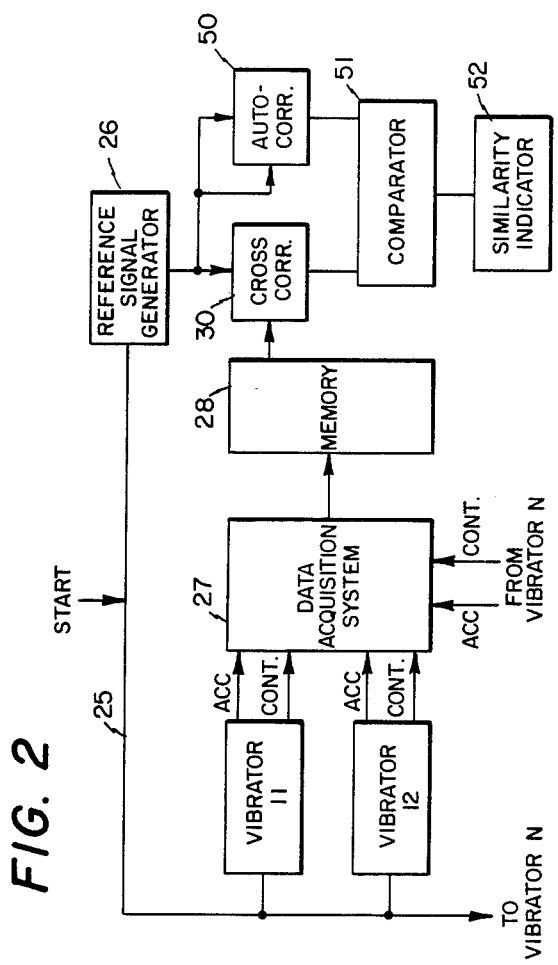
FIG. 2 represents in block schematic form one embodiment of the present invention.

In accordance with the present invention the method for testing the vibrator signals is useful in determining whether or not to utilize any given vibrator in conducting the exploration survey. The test can be performed by the system illustrated in FIG. 2. The test for vibrator accuracy, usually conducted in the morning prior to the actual exploration survey, begins with an initiation of a start signal from the recording truck applied to conductor 25 to initiate operations of a control or reference signal generator 26 and the vibrators, 11, 12,—N. While the accuracy test for the vibrators can be carried out simultaneously, it will be described initially with the operation for checking the accuracy of vibrator 11.

With the onset of a start signal, the control signal generator for vibrator 11 begins operating and a vibrator control signal is generated. In addition, the output from the accelerometer is an electrical signal and both the accelerometer signal and the vibrator control signal are selectively acquired by acquisition system 27 and stored temporarily in memory 28 until they are entered into cross-correlator 30.

In FIG. 3, the system reference signal is represented by the sweep signal 40 and the vibrator control signal from vibrator 11 is represented by sweep signal 41. As can be seen, the sweep signals 40 and 41 are initiated at the same time and are very similar in character, particularly with regard to phase. The resultant output from the cross-correlator 30 thus will take on the appearance of the cross-correlation function 42 wherein the peak represents phase coherence. Similarly, the accelerometer signal for vibrator 11 represented by signal 43 is similar to the sweep signal 40 from the system reference and therefore the cross-correlation output would also be like that shown by the cross-correlation function 42 whose peak represents phase coherency. However, the control signal from vibrator 12, as represented by sweep signal 45, has two characteristics immediately identified as being different from those of system reference sweep signal 40, they are the start time of the sweep signal 45 as well as the phase of that signal. The output from the cross-correlator 30 of FIG. 2 having as its input the system reference sweep signal 40 and the vibrator 12 control signal 45 would take on the appearance of the cross-correlation function 46 having a delay for example of 28 milliseconds. In order that a definitive measure be made of signal accuracy and to avoid subjective analysis there is provided in FIG. 2 an auto correlator 50 to whose inputs are applied the system reference 40. The output of the auto correlator 50 is applied to one input of a comparator 51 and the output of cross-correlator 30 is applied to another input of the comparator. The output of the correlator 50 is an ideal correlation function both in terms of amplitude phase coherency and time occurrence. The comparator 51 takes the ratio of the amplitudes of the correlation functions and outputs a signal to the similarity indicator 52 as to the percentage of the output of cross-correlator 30 with respect to the idealized output of the correlator 50. In addition, the time occurrence of correlations is compared and the time difference appears also as a display by the similarity indicator 52.

The accuracy of the vibrators can be processed individually. For example, the character of accelerometer signal 43 from vibrator 11 may be processed as above described. Then if desired the vibrator 11 control signal 41 may be transferred from memory to the cross-correlator for an accuracy determination. Likewise the two outputs from the vibrator 12, those being the accelerator signal and the control signal, may be transferred from the memory to the cross-correlation 30 for accuracy determination. Each accuracy determination in the above mode is carried out with individual sweeps of the vibrators. If desired, all the accelerometer signals from the vibrators 11, 12, and N may be acquired simultaneously into the memory 28, correlated and compared sequentially, and then displayed simultaneously.

It has become a practice today to employ digital equipment in the processing of seismic data. Accordingly, the signals applied to the cross correlator 30 and the auto correlator 50 will be digital rather than analog signals. And inasmuch as the accuracy determinations are principally based upon phase characteristics and not amplitude, the process of the present invention can be simplified by squaring the sweep signals 40, 41, 43, etc., and then digitizing those signals. The digitized signals may be in multibit or one bit representation.

Figure 4:
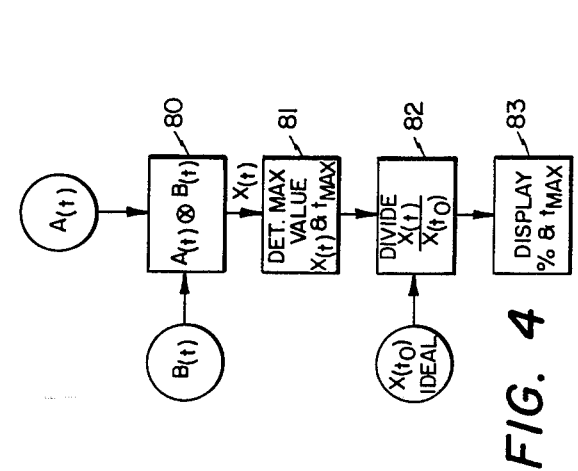
FIG. 4 represents a flow diagram which is useful in the practice of the present invention with software.

The present invention may be practiced either with hardware or software. In FIG. 4 there is illustrated a flow diagram which can serve as the basis for the formulation of a software implementation of the invention. Having the flow diagram available, it is well within the skill of the art to prepare a program listing of instructions to a general purpose digital computer for the purpose of determining vibrator accuracy in accordance with the present invention. Specifically one input signal identified as A(t) represents the system reference signal whereas one of the signals from the vibrator, either the accelerometer signal or the vibrator control signal, is presented by an input B(t). These two signals are cross correlated in step 80 to generate the cross correlation function X(t) and in step 81 the maximum value of X(t) as well as the time occurrence of the maximum value is determined. The next step is to divide as in step 82 the maximum value of X(t) by the maximum value of an ideal function $X(t_o)$ to determine what percentage of the ideal value the detected or determined maximum value is. The resultant division is then displayed at 83 as the percentage of the maximum value of the ideal function. Accordingly, instead of displaying an analog function such as the correlation function 42 of FIG. 3 there would be displayed the value of 95% and 0 time. Likewise the analog wave form of the cross-correlation function 46 would be substituted by an alpha numeric display of 90% and a 28 millisecond delay.

The preferred method of the present invention can be performed in the manner illustrated in FIG. 5. The signal from reference signal generator 60 is applied to the acquisition system 61 and thence to memory 62. The acquisition system 61 conditions the reference signal by squaring the waves and digitizing the signal to one bit. A suitable system for performing the squaring and one bit digitization is described in U.S. Pat. No. 4,042,905 issued Aug. 16, 1977 and entitled Data Acquisition, Transport and Storage System. Similarly, a signal is generated by generator 65 representing the vibrator sweep control signal or the accelerometer output and is applied to acquisition system 61 and thence to memory 66. Assuming a sweep length of 12 seconds and sample rate of 2 milliseconds, the sweep length can be represented by samples as being equal to 6,000. These one-bit signals are called from memory 62 and 66 and applied to a correlator 67 whose output can be represented as being equal to 2M-L: where M equals the number of matches, and L is the length of the sweep signal, in this example 6,000. The output of the correlator 67 is applied to a display output 68 where a numerical display is provided of the correlation function. The output is also applied to a maximum absolute value detector 70 which searches the output of the correlator and finds the maximum value of the matches produced during the correlation operation. The detector 70 also identifies the time occurrence of the maximum value. The time occurrence is then applied to a display 71 and the maximum value in terms of matches is applied to one input of a divider 72.

Another function representative of the ideal correlation value, in this example 6,000, is generated in block 73 and applied to another input of the divider where a ratio is taken of the maximum number of matches produced by the correlator 67 divided by the ideal correlation value. That ratio in terms of percent is then applied for display in block 71. On the other hand, the ratio may be utilized to energize lamps, one indicating an acceptance value of the ratio and the other indicating an unacceptable value of the ratio.

The operator may now, by simply observing the display in block 71, determine the accuracy of the vibrator signal and either accept or reject the use of any given vibrator for the exploration procedure to be conducted that particular day.

Now having described the invention and preferred embodiment thereof, other modifications will become apparent to those skilled in the art and it is intended to cover such modifications as fall within the scope of the appended claims.

What is claimed is:

1. A system for seismic exploration wherein a plurality of vibrator sources are employed simultaneously to generate an input signal whose frequency varies as a function of time and wherein said signal is reflected and refracted to detector stations from subsurface beds, in which said sources are tested to select for exploration those sources having substantially the same output characteristics, said system comprising:
    a. means for generating at a first location a system vibratory reference signal having a pattern of known phase and frequency characteristics,
    b. means for generating at a first vibrator source a signal representative of the output of said source,
    c. means for converting said system reference signal and said signal representative of the output of said source to constant amplitude such that the signal pattern of each is represented only by phase and frequency,
    d. means for cross-correlating said converted system reference signal with said converted signal representative of the output of said source to generate a cross-correlation function,
    e. means for generating with said reference signal a correlation function, and
    f. means for comparing the peak value of said cross-correlation function with the peak value of said correlation function to obtain the degree of accuracy of said signal representative of the output of said source, whereby the degree of accuracy of each source is utilized to select for exploration those sources whose accruracy is substantially the same.

2. The system of claim 1 including means for indicating the time alignment of said signal representative of the output of said source with said reference signal.

3. The system of claim 1 in which said correlation function is the auto-correlation of the system reference signal.

4. A method of seismic exploration wherein a plurality of vibrator sources are employed simultaneously to generate vibratory input signals each having a characteristic which varies as a function of time and wherein said signals are reflected and refracted to detector stations from subsurface beds, in which said sources are tested for signal accuracy comprising the steps of:

a. generating at a first location a system vibratory reference signal having a pattern of known phase and frequency characteristics,
b. generating at a vibrator source a signal representative of the output of said source,
c. cross-correlating said system reference signal with said signal representative of the output of said source to generate a cross-correlation function having a peak value representative of phase coherence,
d. establishing from said reference signal a correlation function having a peak value representative of maximum coherence,
e. comparing the peak value of said cross-correlation function with the peak value of said correlation function to obtain an indication of accuracy of said signal representative of source output,
f. comparing the time of occurrence of the peak value of the cross-correlation function and the time of occurence of the peak value of the correlation function to obtain an indication of time alignment of said signal representative of the output of said source, and
g. utilizing in exploration those sources tested having outputs whose degree of accuracy and time alignment are substantially the same.

5. The method of claim 4 including the step of converting said system reference signal and said signal representative of the output of the source to constant amplitude such that the signal pattern is represented only by phase and frequency.

6. The method of claim 4 in which said signal representative of the output of the source is a vibrator control signal generated at the source.

7. The method of claim 4 in which said signal representative of the output of the source is an output from a motion detector attached to the source.

8. The method of claim 7 in which the sources are operated simultaneously and the signals generated by each are digitized and multiplexed for transmission, transmitted to the first location, demultiplexed, and cross-correlated with said system reference signal at said first location.

9. The method of claim 8 in which the sources are operated sequentially and steps a. through f. are performed for each of said sources.

10. The method of claim 5 wherein said signals are converted to square waves to provide said constant amplitude.

11. The method of claim 4 in which said correlation function is the auto-correlation of the system reference signal.

12. The method of claim 4 in which said maximum value of said cross-correlation function is the peak number of matching samples and said peak value of said correlation function is represented by the total number of samples in a digitized representation of said system reference signal.

* * * * *